United States Patent Office 3,062,421
Patented Nov. 6, 1962

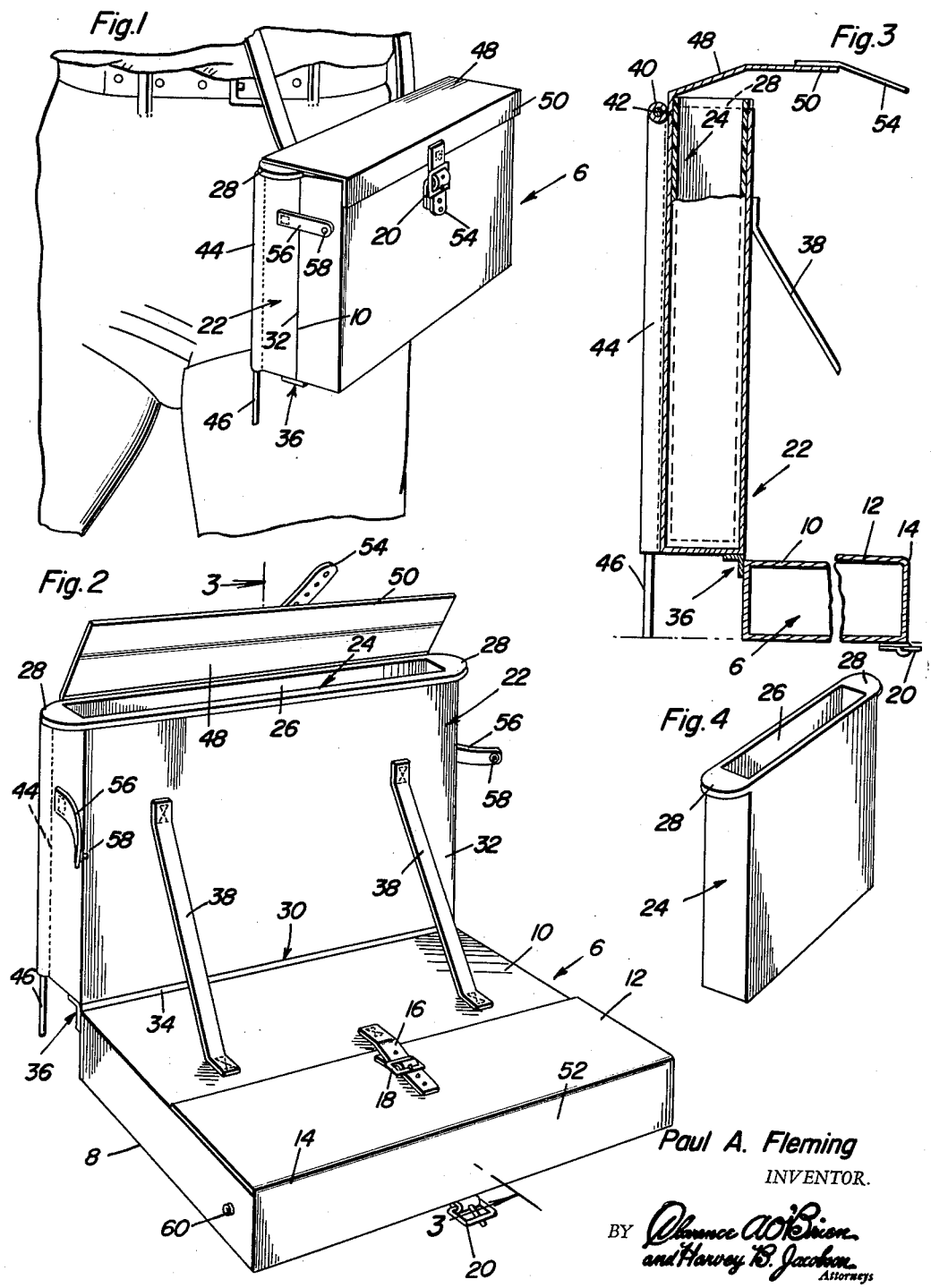

3,062,421
ANGLER'S FISH AND TACKLE CONTAINER
Paul A. Fleming, 112 Fern St., Nampa, Idaho
Filed Aug. 5, 1959, Ser. No. 831,800
6 Claims. (Cl. 224—7)

This invention relates to an improved creel-like multi-purpose angler's portable container construction, that is, a construction embodying two related strap-supported containers, one for live fish caught by hook and line, the other container serving as a tackle box.

One improvement has to do with a simple dual arrangement of hingedly connected parts or components which may be folded together and into compact and convenient form for handling and carrying and may also be spread apart into L-shaped form and in a manner to assume an upright position permitting access to be had to the parts for practical use thereof.

Another improvement relates to the above construction and wherein one part comprises a canvas or an equivalent pouch or pocket having a insertable and removable rigid plastic or an equivalent liner providing a fish container. This arrangement is desirable in that said container can be removed, washed and replaced, thus promoting sanitation and reducing obnoxious odors to an acceptable minimum.

As will be hereinafter evident the parts are made of canvas and are reinforced to maintain their intended shape, preferably, but not necessarily, rectangular. The reinforcing means in the pocket or pouch takes the form of a frame. Also the limbs of this frame project and serve as legs and may be used to assist in assuming an upright or standing position. Suitable cover and fastening means is also provided and aids in keeping the parts together when so desired or necessary.

In addition to the above it may be added that the construction is such that the washable sanitary container can be removed, the fish cleaned and replaced in the container with the latter used as a vessel, say for a camping trip. It will be clear, too, that the advantage of the suitably made canvas components or bags is derived from the L-shaped form attainable. The flat outer wall of the tackle container provides a suitable bottom and the complemental pouch stands up at right angles and is partly supported by the downwardly projecting legs.

Other objects, features and advantages will become more readily apparent from the following description and the accompanying illustrative drawing.

In the drawing:

FIG. 1 is a view in perspective of the improved angler's fish and tackle container showing the same equipped with a shoulder strap and assuming a carrying position;

FIG. 2 is an enlarged perspective view with the components parts spread or swung to the aforementioned open L-shaped position;

FIG. 3 is a view fragmentarily shown and taken approximately on the plane of the line 3—3 of FIG. 2; and FIG. 4 is a perspective view, on a small scale, of the insertable and removable fish container.

It is believed that the construction is best disclosed in FIG. 2 wherein it will be observed that one part of the dual construction is denoted by the numeral 6 and this provides the desired tackle "box" or container. The generally flat outer wall of this rectangular part is denoted at 8 and may be used as a supporting bottom positioned on a support surface in the manner illustrated. The flat inner wall 10 preferably includes a fixed portion and a relatively movable or swingable portion 12, the latter being hingedly mounted at 14 and providing a suitable cover for the interior space or compartment of the container. A strap 16 is fastened to the stationary portion and a buckle 18 to the cover portion thus providing suitable fastening means for the cover portion. The bottom wall 8 is provided centrally with a suitably available buckle 20 which serves a purpose to be hereinafter described.

The fish container is actually made up of two components; namely the canvas or equivalent pocket or pouch 22 and the insertable and removable liner 24. This "liner" is also to be recognized as the live fish container. It fits snugly in the receptacle portion of the pocket or pouch 22 and is readily removable. It is made of suitable plastic material and rigid and gives the desired shape to the pouch. The open mouth portion is denoted at 26 and it will be noted that end flanges 28 are provided and these constitute finger grips and overhang the adjacent end portions of the pouch. These finger grips assist in inserting and removing the fish container 24. The lower edge or corner portion 30 of the inner flat wall 32 of the pouch is joined to the cooperating edge or corner portion 34 by a suitable fabric or equivalent hinge 36. The two parts 6 and 22 are both rectangular in form and are of a construction that they may be folded together in a book-like manner to assume the closed position seen in FIG. 1. The hinge also allows the parts to assume the open or L-shaped arrangement seen in FIG. 2. In this connection and if desired flexible straps or stays 38 may be provided and these are attached respectively to the parts 6 and 22 in the manner shown and they, too, assist in permitting the construction to take the open position seen in FIG. 2. By the same token these straps are sufficiently flexible that they do not interfere with the compact folding of the parts when necessary or desired. A suitable hem 40 of general U-shaped form is provided on the outer wall of the pouch 22 and it contains a corresponding U-shaped wire pouch reinforcing and shape-sustaining frame the bight portion of which is denoted at 42 and the limbs of which extend down through the hem pockets 44 and beyond the lower ends thereof where they project and provide outstanding supporting legs 46. The legs may terminate substantially flush with the level of the bottom wall 8 so that the device may be positioned in an upright manner as illustrated. The pouch also has a flap 48 which is attached as shown in FIG. 3 at one end and has its opposite end open to provide a foldable lip 50. This flap constitutes a cover and it obviously covers over the mouth portion of the container, that is the portion 26. It also extends over the cooperating edge portion 52 so that the strap 54 carried thereby may be connected with the aforementioned buckle 20. It follows that the device may be closed up to assume compact and convenient carrying form as shown in FIG. 1. It may also be desirable to provide additional fastening straps as at 56. These straps are attached at one end and are provided with snap-fasteners 58 engageable with the cooperating snap-fasteners 60.

It may be considered as within the sphere of the invention to use a construction such as this for carrying bait.

As to the rectangular shape of the tackle container or box 6 it may be obtained with suitably reinforced canvas (not detailed).

It is believed that the description read in conjunction with the drawing will enable the reader to obtain a clear understanding of the construction and arrangement of parts and the manner in which they cooperate to achieve the desired improved results.

Minor changes in shape, size, and rearrangement of parts may be resorted to in actual practice without departing from the spirit of the invention or the scope of the invention as claimed.

What is claimed as new is as follows:

1. An angler's fish container and carrier embodying a flexible pouch having an open mouth portion, and an insertable and removable fish container fitted into and lining the receptacle portion of said pouch, said container being rigid, waterproof, non-corrodible and adapted to receive and carry live fish caught by hook and line and cold water for preserving the fish, said container being adapted to be removed from said pouch, washed and replaced and thus be kept in a sanitary odorless condition, said container being open at its top and is provided with at least one finger-grip to facilitate inserting the container in said receptacle portion and later removing it for washing and cleaning, said pouch having a cover adapted to extend over and close the container whenever necessary or desired, one side wall of said pouch being reinforced to hold a given normal shape by reinforcing means which includes depending legs to assist in supporting and retaining the pouch in an upright readily usable position, and a fishing tackle container hingedly connected to and carried by said fish container, said fish container being of such rigidity as to prevent the weight of said tackle container and its contents from collapsing its side walls.

2. For use by an angler, a flexible pouch having bottom, side and end walls, one side wall constituting an inner wall, said wall being provided around the top and vertical marginal portions with a hem, said being of inverted U-shaped form and containing a correspondingly U-shaped wire reinforcing frame, said wire frame embodying legs and end portions of said legs projecting beyond the bottom of the pouch, a rigid fish container fitted snugly but removably into the receptacle portion of the pouch and lining said receptacle portion, said container being closed except at the top and said top providing an open mouth, said top portion being provided with outwardly projecting finger-grips which serve to facilitate inserting and removing the container relative to said receptacle portion and prevents the container from falling entirely into said pouch, said pouch having secured thereto a readily openable and closable hingedly mounted cover, said cover having a free edge portion embodying a flap, a tackle container hinged to the bottom of said pouch adjacent said inner wall, said cover overlapping the tops of both said container and said pouch, said flap and tackle container having fastening means for securing the flap to the tackle container.

3. For use by an angler, a flexible waterproof pouch having bottom, side and end walls, one side wall constituting an inner wall, said wall being provided around the top and vertical marginal portions with a hem, said hem being of inverted U-shaped form and containing a correspondingly U-shaped wire reinforcing frame, said wire frame embodying legs and end portions of said legs projecting beyond the bottom of the pouch, a rigid fish container fitted snugly but removably into the receptacle portion of the pouch and lining said receptacle portion, said container being closed except at the top and said top providing an open mouth, said top portion being provided with outwardly projecting finger-grips which serve to facilitate inserting and removing the container relative to said receptacle portion, said pouch having a readily openable and closable hingedly mounted cover, said cover having a free edge portion embodying a flap, and an over-all rigid container having a wall opposed to the outwardly disposed wall of said pouch, said walls being provided with flexible folding stay-straps which allow the containers to fold together or the second-named container to swing out and down to assume a position at right angles to the pouch, the bottom wall of said pouch being hingedly connected to a corner portion of a cooperating bottom wall of said container, said cover being of a size that it simultaneously covers over the fish container and a cooperating marginal edge of the second-named container, said flap being cooperable with an outer wall of the second container and having means releasably connected to said last-named outer wall whereby the flap simultaneously covers both containers and secures them together in side-by-side relationship.

4. A portable multipurpose angler's container construction comprising, in combination, a box-like tackle container having inner and outer flat walls, the outer flat wall being adapted to rest flatwise on a support surface as the ground for example, and a fish container hingedly connected to said tackle container, said fish container also having an inner flat wall foldable against the inner flat wall of said tackle container, whereby the two containers abut each other and may be temporarily fastened together for carrying and easy handling by way of an attached shoulder strap, said fish container embodying a flexible pouch having a rigid liner constituting the fish container proper, said container being removable from said pouch, said pouch being made of flexible material and having a reinforcing member attached to an outer wall to impart and sustain the desired given shape of said pouch, said member having projecting legs the ends of which lie in the same plane with the outer flat wall of the tackle container for cooperation therewith, whereby the two containers may be arranged for supported use in positions at right angles to each other.

5. A portable multipurpose angler's container construction comprising, in combination, a box-like tackle container having inner and outer flat walls, the outer flat wall being adapted to rest flatwise on a support surface as the ground for example, and a fish container hingedly connected to said tackle container, said fish container also having an inner flat wall foldable against the inner flat wall of said tackle container, whereby the two containers abut each other and may be temporarily fastended together for carrying and easy handling by way of an attached shoulder strap, said fish container embodying a flexible pouch having a rigid liner constituting the fish container proper, said container being removable from said pouch, said pouch being made of canvas and having a reinforcing member attached to an outer wall to sustain the desired given shape, said member having projecting legs the ends of which lie in the same plane with the outer flat wall of the tackle container for cooperation therewith, whereby the two containers may be arranged for supported use on said support surface in positions at right angles to each other, said pouch having a cover and said cover having a flap, and means serving to fasten the flap to said tackle container.

6. A portable multipurpose angler's container construction comprising, in combination, a box-like tackle container having inner and outer flat walls, the outer flat wall being adapted to rest flatwise on a support surface as the ground for example, and a fish container hingedly connected to said tackle container, said fish container also having an inner flat wall foldable against the inner flat wall of said tackle container, whereby the two containers abut each other and may be temporarily fastened together for carrying and easy handling by way of an attached shoulder strap, said fish container embodying a flexible pouch having a rigid liner constituting the fish container proper, said container being removable from said pouch, said pouch being made of canvas and having a reinforcing member attached to an outer wall to sustain the desired given shape, said member having projecting legs terminating in the same plane as defined by the outer flat wall of the tackle container for cooperation therewith, whereby the two containers may be arranged for supported use in positions at right angles to each other, said pouch having a cover and said cover having a flap, and means serving to fasten the flap to said tackle container, and flexible folding stay-straps connected to the adjacent inner walls of the pouch and tackle container respectively, said stray-straps assisting in holding the parts in readily accessible relationship and also permitting them to fold book-like into compact and convenient relation for carrying.

References Cited in the file of this patent

UNITED STATES PATENTS

| | | |
|---|---|---|
| 515,899 | Breithaupt | Mar. 6, 1894 |
| 1,354,660 | Kanthack | Oct. 5, 1920 |
| 1,736,337 | Borel | Nov. 19, 1929 |
| 1,849,545 | Liebold | Mar. 15, 1932 |
| 1,869,071 | McLean | July 26, 1932 |
| 2,324,495 | Deming | July 20, 1943 |
| 2,474,752 | Montgomery | June 28, 1949 |
| 2,555,128 | Gutshall | May 29, 1951 |
| 2,677,486 | Schermerhorn | May 4, 1954 |

FOREIGN PATENTS

| | | |
|---|---|---|
| 771,744 | France | July 30, 1934 |
| 475,587 | Canada | July 31, 1951 |